F. G. BENSON.
FOLDING SCREW DRIVER.
APPLICATION FILED OCT. 12, 1907.
906,855.
Patented Dec. 15, 1908.
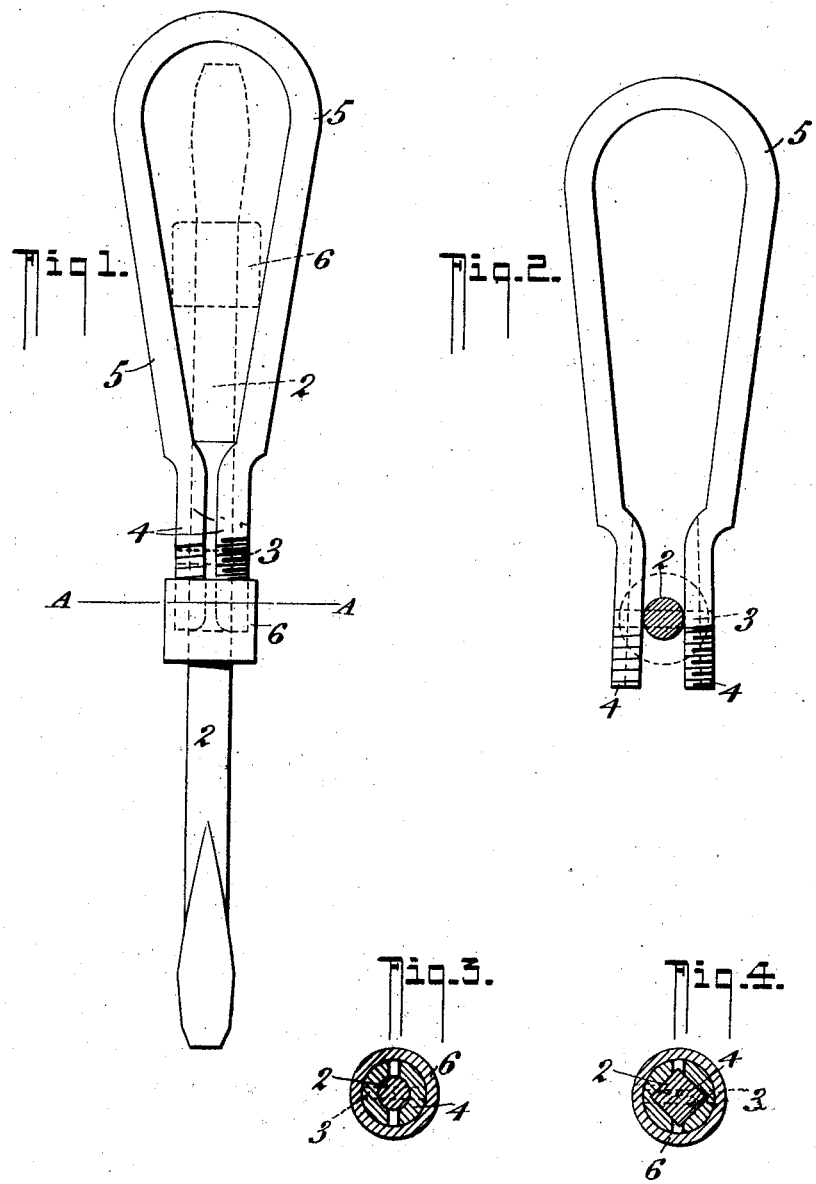
WITNESSES:
John T. Schrott
H. Woodard
INVENTOR
Frank G. Benson.
BY
Fred G. Dieterich
ATTORNEY

UNITED STATES PATENT OFFICE.

FRANK G. BENSON, OF VANCOUVER, BRITISH COLUMBIA, CANADA.

FOLDING SCREW-DRIVER.

No. 906,855.   Specification of Letters Patent.   Patented Dec. 15, 1908.

Application filed October 12, 1907. Serial No. 397,222.

*To all whom it may concern:*

Be it known that I, FRANK G. BENSON, citizen of the United States of America, residing at Vancouver, in the Province of British Columbia, Canada, have invented a new and useful Improvement in Folding Screw-Drivers, of which the following is a specification.

This invention relates to a folding screw-driver adapted to be carried in the pocket either alone or attached to a key ring. It is particularly designed to be quickly opened for use and susceptible when so open of being securely fastened in the handle, so as to be strong enough for any strain which from its size is likely to be imposed upon it. Many devices for this purpose are at present in the market, but most of them are too bulky for pocket use in adapting the handle to carry a multiplicity of small tools. A screw-driver is however of such general usefulness as to justify it being supplied as a separate tool, and having facility for folding into small space, but in so adapting it care should be taken that it is strong enough to perform its work in a satisfactory manner.

The invention is particularly described in the following specification, reference being made to the drawings by which it is accompanied, in which:

Figure 1 is a side elevation showing the screw-driver as extended for use and in dot and dash lines its position when folded, Fig. 2, shows the screw-driver as partially folded, showing the action of the spring handle, Fig. 3, a cross section on the line A A in Fig. 1, and Fig. 4, a similar view showing a modification of shank and groove.

In these drawings 2 represents the shank of the screw-driver, which is pivotally mounted on a pin 3 between the ends 4 of a resilient handle 5. The shank 2 may be of any approved cross section, either cylindrical as shown in Figs. 1, 2, and 3 or square, as shown in Fig. 4, and the ends 4 of the handle are each grooved to fit the shank. The external surface of the ends 4 are cylindrical or may have a very slight entering taper and on these outer ends a sleeve 6 is fitted slidably tight, the end of the sleeve adjacent to the end of the driver having a portion fitting the shank 2.

When the sleeve 6 is withdrawn clear of the ends 4 the screw-driver may be turned to the position shown by dot and dash lines in Fig. 1, the grooved ends 4 being pressed apart against the spring resistance, as shown in Fig. 2, to permit of this movement and springing together again to retain the driver in the folded position, as shown by dot and dash lines in Fig. 1.

In the open position, as when required for use, the sleeve 6 is pressed over the ends 4 on which it tightly fits, which will secure the ends 4 from spreading apart and the shank of the driver is securely held by the grooves. When the shank is cylindrical as shown in Figs. 1, 2 and 3 the torsion imposed on the shank in use is borne by the shearing strength of the pin 3, which construction may be sufficient for the smaller sizes, but for the larger or better class of screw-driver the torsion is sustained by the square corners in the V groove of the handle ends 4.

I am of opinion that a cylindrical or slightly tapered fit of the sleeve 6 upon the outside of the ends 4 will be sufficient to retain the sleeve upon these ends, but if considered desirable the ends may be threaded with a slight taper upon which the sleeve will fit as a nut.

I am aware that small tools of this class have, prior to my invention been mounted between the contiguous ends of a resilient handle, and that others have been mounted in sockets over the outside of which a tapered sleeve has been threaded to secure the tool in the socket; but in none with which I am acquainted has the sleeve plain or threaded been passed over the ends of a resilient handle with the object of securing those ends together and rigidly fastening the tool in an operative position.

I therefore declare that what I claim as new and desire to be protected in by Letters Patent, is:

1. A pocket tool of the class described, comprising a screw-driver or other tool of a like character pivotally mounted between the ends of a resilient handle a groove in such handle fitting the edges of the tool and a sleeve slidable on the shank of the tool, and fitting the outside of the handle ends and means for positively retaining the sleeve on the outside of the handle ends.

2. A folding screw-driver, comprising a screw-driver having a square shank pivotally mounted on a diagonal line through the shank between the contiguous ends of a resilient handle, which ends are grooved to fit the shank and a sleeve movable onto the shank of the screw-driver and threaded connections between said handle ends and said sleeve.

In testimony whereof I have signed my name to this specification in the presence of two subscribing witnesses.

FRANK G. BENSON.

Witnesses:
ROWLAND BRITTAIN,
CLIVE S. CARMAN.